(12) United States Patent
Nibarger et al.

(10) Patent No.: US 7,746,596 B2
(45) Date of Patent: Jun. 29, 2010

(54) LINEAR TAPE DRIVE MODULE FOR A LINEAR TAPE DRIVE SYSTEM

(75) Inventors: John P. Nibarger, Superior, CO (US); Edward V. Denison, Erie, CO (US)

(73) Assignee: Oracle America, Inc., Redwood City, CA (US)

( * ) Notice: Subject to any disclaimer, the term of this patent is extended or adjusted under 35 U.S.C. 154(b) by 848 days.

(21) Appl. No.: 11/619,330

(22) Filed: Jan. 3, 2007

(65) Prior Publication Data

US 2008/0158719 A1 Jul. 3, 2008

(51) Int. Cl.
*G11B 5/584* (2006.01)
*G11B 5/29* (2006.01)
*G11B 5/265* (2006.01)
*G11B 5/187* (2006.01)

(52) U.S. Cl. ............... 360/121; 360/76; 360/48; 360/77.12; 360/122

(58) Field of Classification Search ............ 360/48, 360/75, 76, 77.12, 121, 122
See application file for complete search history.

(56) References Cited

U.S. PATENT DOCUMENTS

| 5,523,904 | A  | * | 6/1996  | Saliba ............... 360/77.12 |
| 6,031,673 | A  | * | 2/2000  | Fasen et al. ............ 360/53 |
| 6,700,729 | B1 | * | 3/2004  | Beck et al. ............ 360/76 |
| 7,301,716 | B2 | * | 11/2007 | Dugas et al. ........... 360/48 |
| 2004/0109257 | A1 | * | 6/2004 | Beck et al. ............ 360/76 |
| 2004/0174628 | A1 | * | 9/2004 | Schwarz et al. ........ 360/48 |

* cited by examiner

*Primary Examiner*—William J Klimowicz
(74) *Attorney, Agent, or Firm*—Brooks Kushman P.C.

(57) ABSTRACT

A linear tape drive system includes a tape having a path direction, a data track having data transitions at an azimuthal orientation relative to the path direction, and a servo track having servo positioning transitions. A linear tape drive module is configured to read and/or write to the data track at the azimuthal orientation and read the servo positioning transitions.

20 Claims, 6 Drawing Sheets

LINEAR TAPE DRIVE MODULE FOR A LINEAR TAPE DRIVE SYSTEM

BACKGROUND OF THE INVENTION

1. Field of the Invention

The invention relates to linear tape drive modules for linear tape drive systems.

2. Discussion

Linear tape drive systems may include a tape that has data transitions perpendicular to a path direction of the tape and a pre-recorded servo track having angled transitions relative to the data transitions. Data elements may run parallel to the data transitions and a servo element may run across the angled transitions. By indexing across the width of the tape, the servo allows a head to serpentine within a plurality of defined data bands.

A data read element may be 50% of the width of a written track thus allowing for "off track" wander without intercepting the adjacent written track data. The over-sizing of the written track to compensate for off track wander may limit the number of tracks that can be packed across the width of the tape while keeping the magnetic read element width such that a useful signal may be reliably generated.

Helical scan drives may include several independent single track heads mounted on an angle in a rotating drum which spins in the direction of tape motion without the use of an active servo positioning system reference to the tape. While helical scan drives may have lower data rates due to low read/write element count and lower linear data density, it may offer the advantage of packing tracks horizontally on tape next to, or over lapping, each other due to the data signal cancelling realized when a read element is parallel to the desired track transition and up to perpendicular to the adjacent track transition. This allows the read element to be up to the same size as the written track to increase signal output and maximize horizontal track packing.

SUMMARY

Embodiments of the invention may take the form of a linear tape drive module for a linear tape drive system. The system includes a tape having a path direction, a data track having data transitions at an azimuthal orientation relative to the path direction, and a servo track having servo positioning transitions. The module includes a substrate to provide a tape bearing surface for the tape and a thin film data track element constructed on the substrate and configured to at least one of read from and write to the data track at the azimuthal orientation. The module also includes a thin film servo track sensing element constructed on the substrate and configured to read the positioning transitions from the servo track.

DETAILED DESCRIPTION

Figure 1:
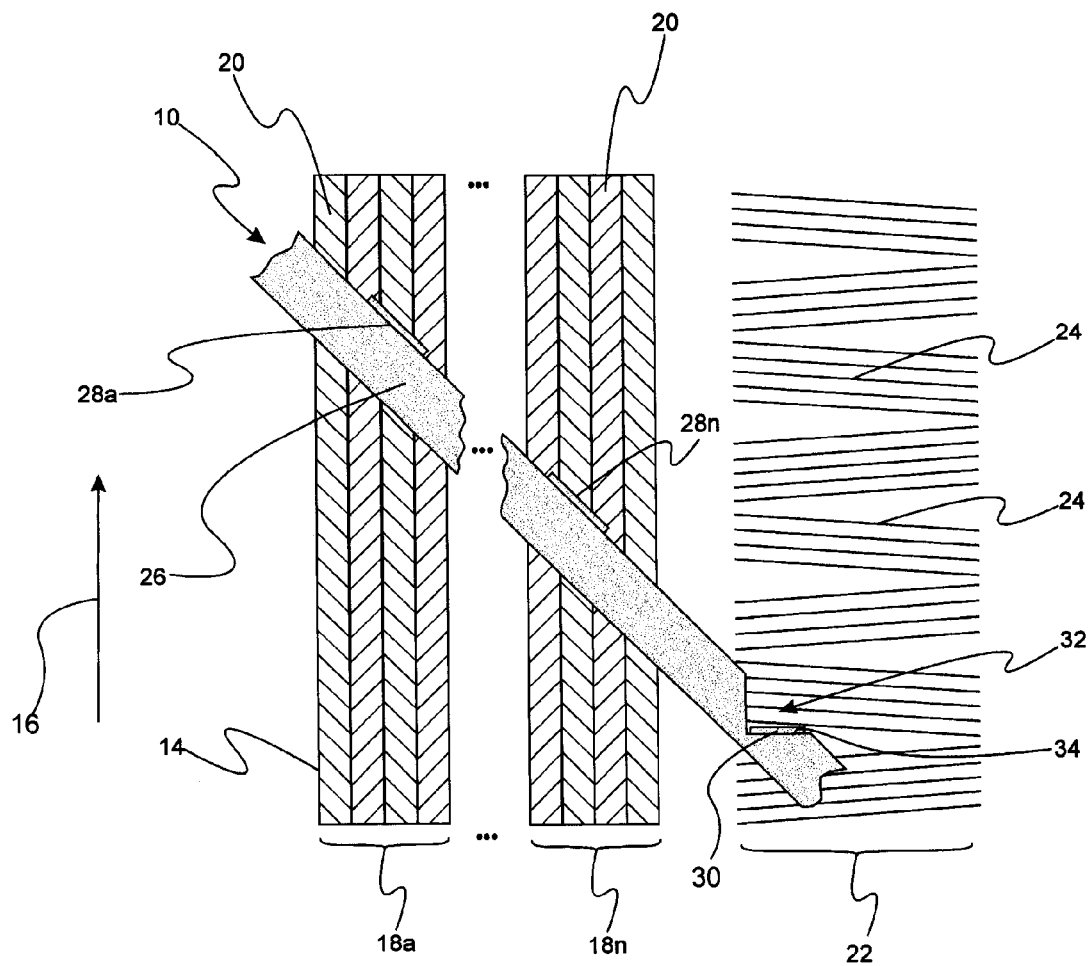
FIG. 1 is a schematic diagram of an embodiment of a portion of a linear tape drive system.

FIG. 1 is a schematic diagram of a portion of a linear tape drive system. The system includes a portion of linear tape drive module 10 and tape 14 having path direction 16. Tape 14 includes data tracks 18a-18n with data transitions 20 at azimuthal orientations relative to path direction 16. The azimuthal orientations shown are +/−45°. Other azimuthal orientations may also be used, e.g., |15°|−|45°|. Tape 14 also includes servo track 22 with servo positioning transitions 24. Servo positioning transitions 24 are shown at angles of +/−7°. Other angles may also be used.

Portion of linear tape drive module 10 includes substrate 26 that provides a tape bearing surface for tape 14, read sensors 28a-28n constructed on substrate 26 that read data transitions 20 at the azimuthal orientation, and servo sensor 30 oriented substantially perpendicular to path direction 16 that reads servo positioning transitions 24.

Servo sensor 30 is disposed in recessed area 32 of substrate 26. Servo sensor 30 is constructed on side wall 34 of recessed area 32 as will be explained in detail below.

Figure 2:
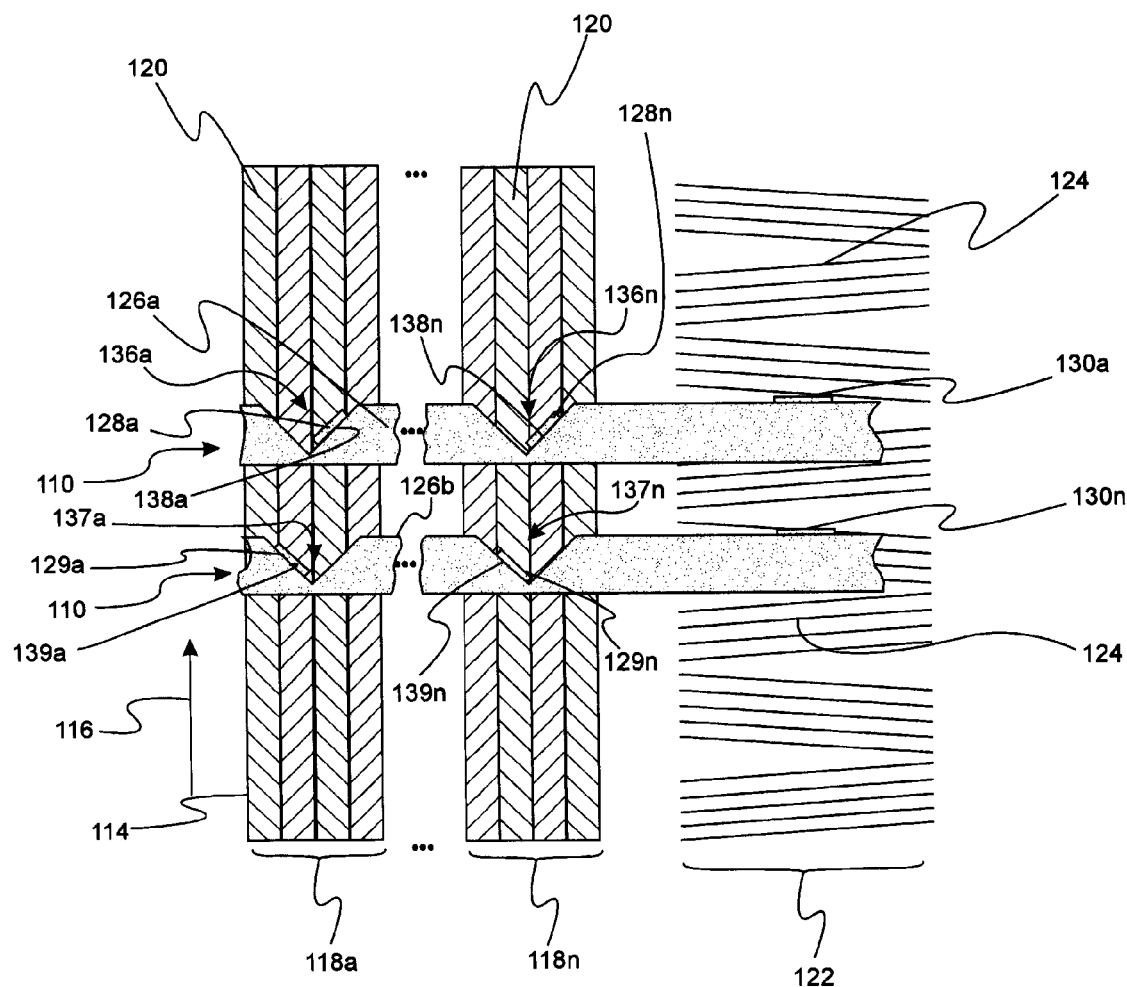
FIG. 2 is a schematic diagram of an alternative embodiment of a portion of a linear tape drive system.

FIG. 2 is a schematic diagram of an alternative embodiment of a linear tape drive system. Numbered elements of FIG. 2 that differ by 100 relative to numbered elements in FIG. 1 have similar descriptions, e.g., 122 and 22 are each servo tracks.

Substrate 126a includes recessed areas 136a-136n. Read sensors 128a-128n are disposed on side walls 138a-138n of recessed areas 136a-136n respectively. Read sensors 128a-128n read data transitions 120 at the azimuthal orientation.

Substrate 126b includes recessed areas 137a-137n. Read sensors 129a-129n are disposed on side walls 139a-139n of recessed areas 137a-137n respectively. Read sensors 129a-129n read data transitions 120 at the azimuthal orientation.

Figure 3A:
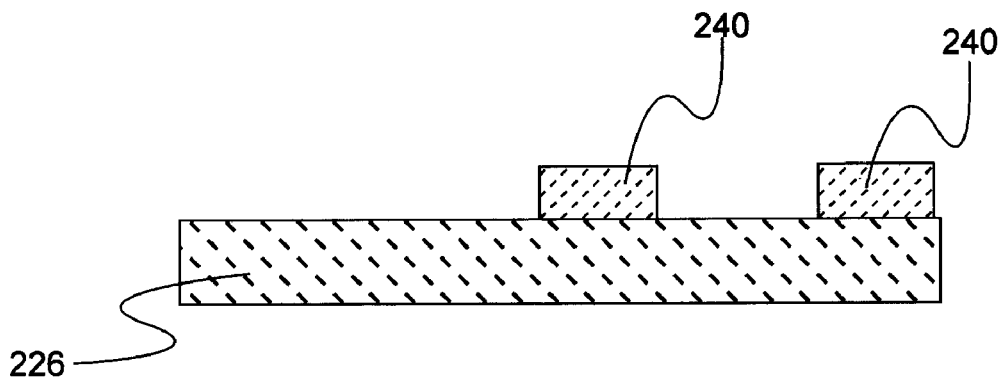
FIGS. 3a-3c are schematic diagrams, in cross-section, of a substrate undergoing a shadowed deposition process to create a recessed angled sensor.
Figure 3B:
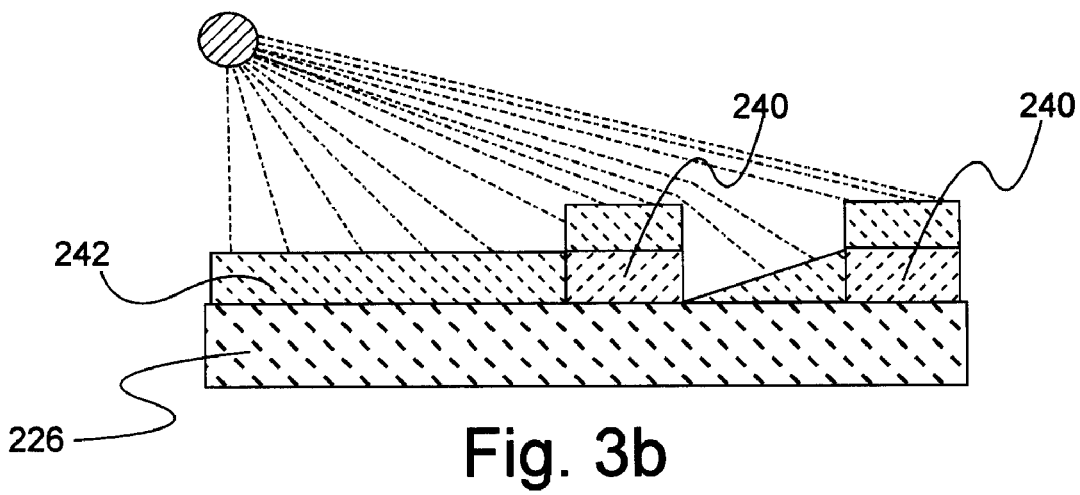
Figure 3C:
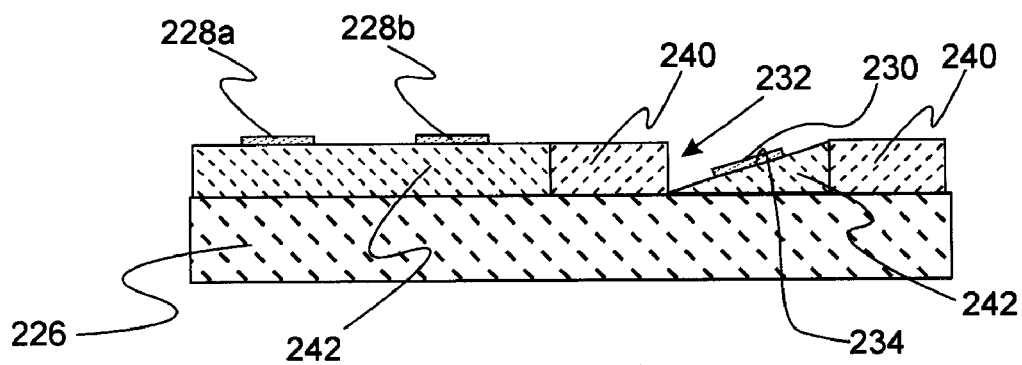

FIGS. 3a-3c are schematic diagrams, in cross-section, of a substrate undergoing a shadowed deposition process to create a recessed area.

FIG. 3a shows substrate 226 and hard windows 240, e.g., alumina, prior to the shadowed deposition process.

FIG. 3b shows substrate 226 and hard windows 240 as material 242, e.g., CZT, is being deposited.

FIG. 3c shows that once material 242 has been deposited and prepared accordingly, servo sensor 230 may be constructed on side wall 234 of recessed area 232. Data sensors 228a and 228b may also be constructed accordingly.

Figure 4A:
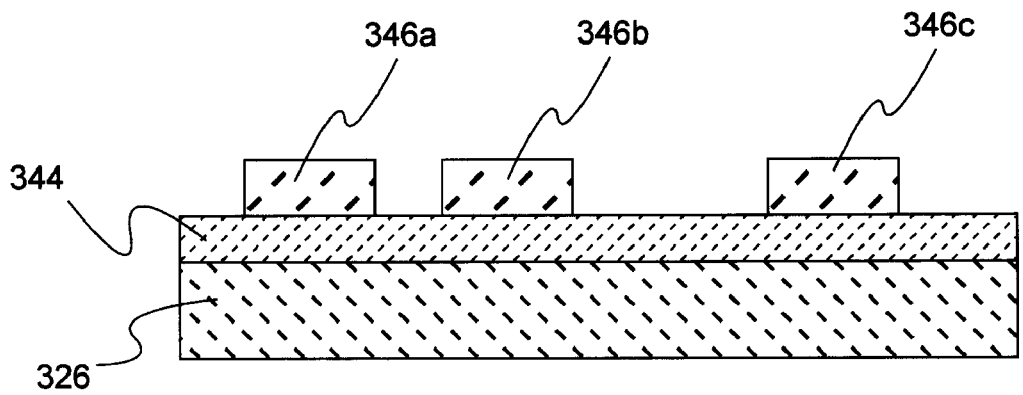
FIGS. 4a-4c are schematic diagrams, in cross-section, of a substrate undergoing an anisotropic etching process to create raised angled sensor.
Figure 4B:
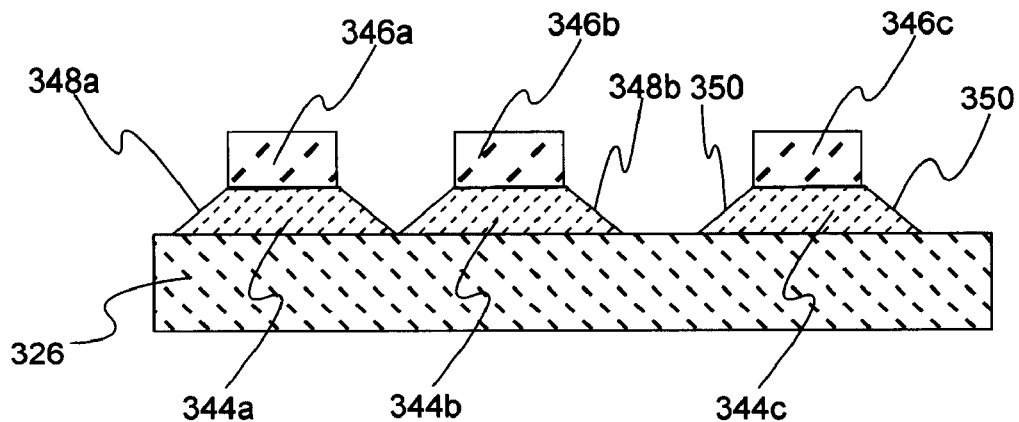
Figure 4C:
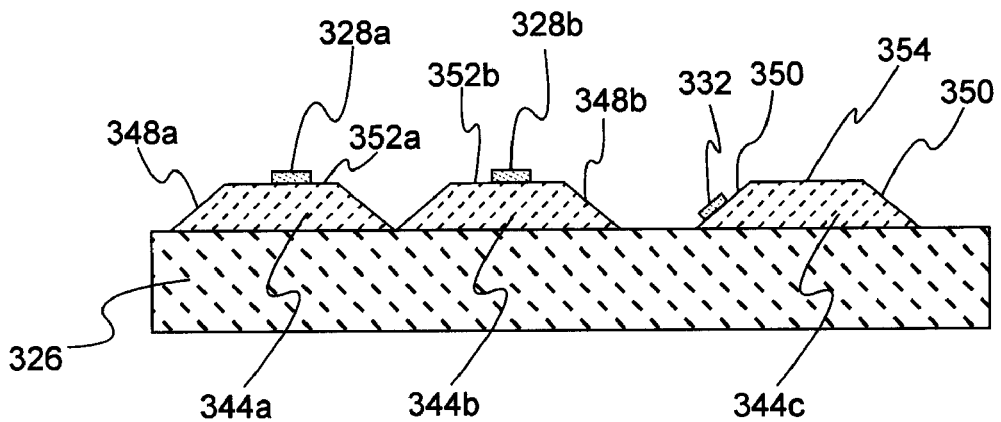

FIGS. 4a-4c are schematic diagrams, in cross-section, of a substrate undergoing an anisotropic etching process to create raised features.

FIG. 4a shows substrate 326 and material 344, e.g. AlFeSi, to be anisotropically etched. Photoresist portions 346a, 346b, and 346c will facilitate the formation of raised features 344a, 344b, and 344c as described in detail below.

FIG. 4b shows raised features 344a, 344b, and 344c after material 344 has been wet etched. Raised feature 344a includes side wall surface 348a. Raised feature 344b includes side wall 348b. Raised feature 344c includes side walls 350.

FIG. 4c shows that, once the photoresist portions 346a, 346b, and 346c have been removed, read sensor 328a may be deposited on surface 352a of raised feature 344a and read sensor 328b may be deposited on surface 352b of raised feature 344b. Alternatively, read sensor 328a may be deposited on side wall 348a of raised feature 344a and read sensor 328b may be deposited on side wall 348b of raised feature 344b.

Servo sensor 332 is deposited on one of side walls 350 of raised feature 344c. Alternatively, servo sensor 332 may be deposited on surface 354 of raised feature 344c.

Figure 5A:
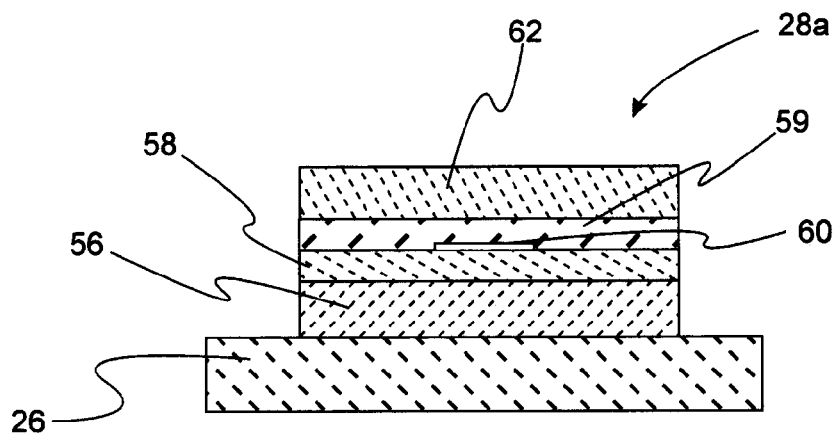
FIG. 5a is a schematic diagram, in cross-section, of a read sensor.

FIG. 5a is a schematic diagram, in cross-section, of read sensor 28a. Read sensor 28a is constructed on substrate 26, e.g., AlTiC with insulative cap, and includes bottom shield 56, e.g., NiFe, AlFeSi, gap alumina 58, 59, sensor element 60, and top shield 62, e.g., NiFe, CZT.

Figure 5B:
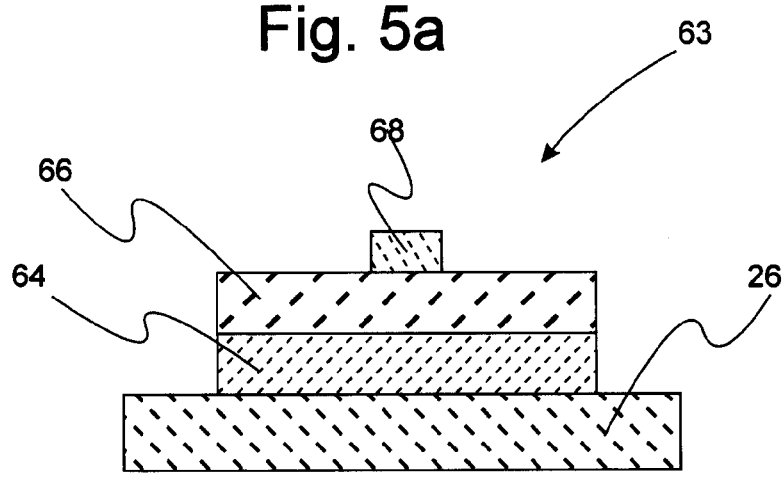
FIG. 5b is a schematic diagram, in cross-section, of a write sensor.

FIG. 5b is a schematic diagram, in cross-section, of write sensor element 63. Write sensor element 63 may be constructed on substrate 26. Write sensor element 63 includes bottom shield 64, e.g., NiFe, AlFeSi, gap alumina 66, and top pole 68, e.g., NiFe, CZT.

Figure 5C:
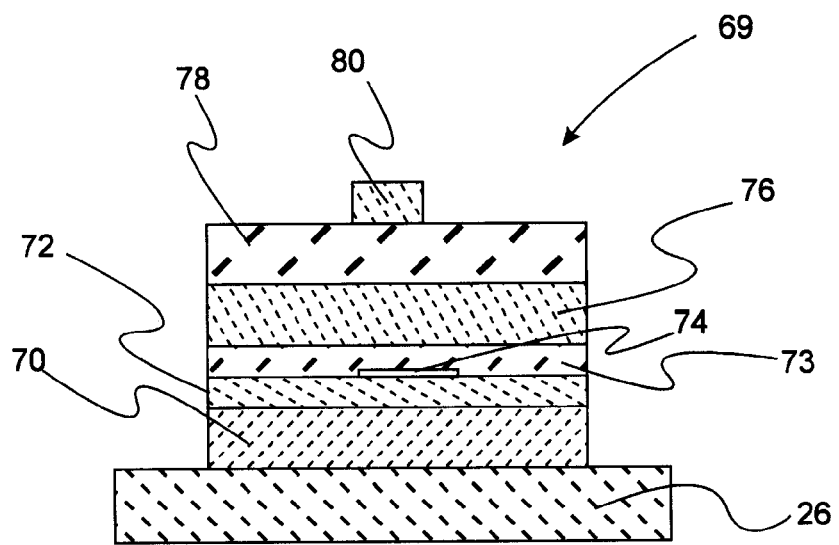
FIG. 5c is a schematic diagram, in cross-section, of a merged pole sensor.

FIG. 5c is a schematic diagram, in cross-section, of merged pole sensor element 69. Merged pole sensor element 69 may be constructed on substrate 26. Merged pole sensor element 69 includes bottom shield 70, e.g., NiFe, AlFeSi, read gap alumina 72, 73, read sensor element 74, shared shield 76, e.g., NiFe, CZT, write gap alumina 78, and top pole 80, e.g., NiFe, CZT.

Read and/or write sensor elements may be constructed in any desired fashion, e.g., piggyback, interleaved.

Figure 6:
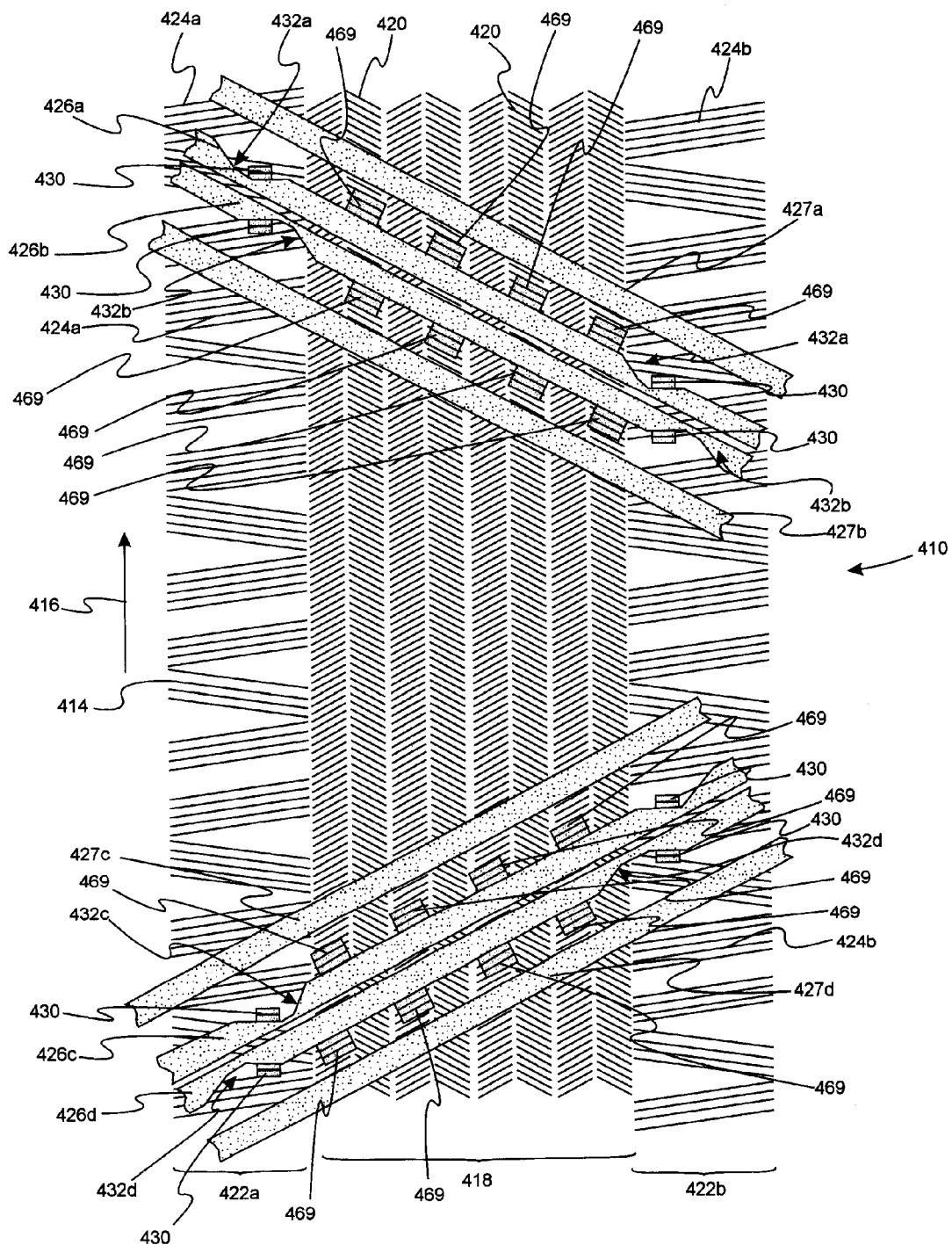
FIG. 6 is a schematic diagram of an embodiment of a module with canted servo tracks for a linear tape drive system.

FIG. 6 is a schematic diagram of module 410 with canted servo tracks 422a and 422b for a linear tape drive system. The system includes tape 414 having path direction 416. Tape 414 includes data tracks 418 with data transitions 420 at an azimuthal orientation of |45°| relative to path direction 16. Other azimuthal orientations may be used, e.g., |15°|–|45°|.

Servo track 422a includes servo positioning transitions 424a at +/–7°. Servo track 422b includes servo positioning transitions 424b similarly configured to servo positioning transitions 424a.

Substrate 426a provides a tape bearing surface for tape 414 and includes recessed areas 432a. Servo sensors 430 are disposed in recessed areas 432a and are configured to read servo positioning transitions 424a and 424b respectively. Merged pole read/write sensors 469 are constructed on substrate 426a as shown. Merged pole read/write sensors 469 are oriented substantially parallel to data transitions 420 at, for example, –45°. Closure 427a, e.g., AlTiC, is associated with substrate 426a.

Substrate 426b and its associated servo sensor elements 430, merged pole read/write sensor elements 469, and closure 427b are generally configured as described with reference to substrate 426a.

Substrate 426c and its associated servo sensor elements 430, merged pole read/write sensor elements 469, and associated closure 427c are generally configured as described above but in the complimentary position relative to substrate 426a.

Substrate 426d and its associated servo sensor elements 430, merged pole read/write sensor elements 469, and associated closure 427d are likewise generally configured as described above but shown in the complimentary position relative to substrate 426b.

Alternatively, any desired architecture may be used. For example, a two module architecture, e.g., read/write-write/read for merged pole or piggyback read/write sensor elements may be used. This two module architecture would include a first substrate and a first set of one or more read/write sensor elements associated with the first substrate, a closure, a second set of one or more read/write elements, and a second substrate. Two module architectures may also use, for example, interleaved read/write sensor elements. Three module architectures may also be used. In any of these architectures the servo tracks may be canted or the data tracks may be canted.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A linear tape drive module for a linear tape drive system, the system including a tape having a path direction, a data track having data transitions at an azimuthal orientation relative to the path direction, and a servo track having servo positioning transitions, the module comprising:
    a substrate to provide a tape bearing surface for the tape;
    a thin film data track element constructed on the substrate and configured to at least one of read from and write to the data track at the azimuthal orientation; and
    a thin film servo track sensing element constructed on the substrate, oriented substantially perpendicular to the path direction, and configured to read the positioning transitions from the servo track.

2. The module of claim 1 wherein the azimuthal orientation is between 15 degrees and 45 degrees inclusive.

3. The module of claim 1 wherein the substrate includes a recessed area and wherein the thin film data track element is on a side wall of the recessed area.

4. The module of claim 1 wherein the substrate includes a recessed area and wherein thin film servo track sensing element is on a side wall of the recessed area.

5. The module of claim 1 wherein the module includes a raised feature and wherein the thin film data track element is on a side wall of the raised feature.

6. The module of claim 1 wherein the module includes a raised feature and wherein thin film servo track sensing element is on a side wall of the raised feature.

7. The module of claim 1 wherein the thin film data track element includes a first shield.

8. The module of claim 1 wherein the thin film data track element includes first and second shields.

9. A linear tape drive module for a linear tape drive system, the system including a tape having a path direction, a data track having data transitions at an azimuthal orientation relative to the path direction, and a servo track, the module comprising:
    a substrate to provide a tape bearing surface for the tape;
    a thin film data track element constructed on the substrate and oriented substantially parallel to the azimuthal orientation; and
    a thin film servo track sensing element constructed on the substrate and oriented perpendicular to the path direction.

10. The module of claim 9 wherein the servo track has servo positioning transitions and wherein the thin film servo track sensing element is configured to read the servo positioning transitions from the servo track.

11. The module of claim 9 wherein the thin film data track element is configured to at least one of read from and write to the data track at the azimuthal orientation.

12. The module of claim 9 wherein the azimuthal orientation is between 15 degrees and 45 degrees inclusive.

13. The module of claim 9 wherein the substrate includes a recessed area and wherein the thin film data track element is on a side wall of the recessed area.

14. The module of claim 9 wherein the substrate includes a recessed area and wherein thin film servo track sensing element is on a side wall of the recessed area.

15. The module of claim 9 wherein the module includes a raised feature and wherein the thin film data track element is on a side wall of the raised feature.

16. The module of claim 9 wherein the module includes a raised feature and wherein thin film servo track sensing element is on a side wall of the raised feature.

17. The module of claim 9 wherein the thin film data track element includes at least one of a first shield and a second shield.

18. A linear tape drive module for a linear tape drive system, the system including a tape having a path direction, a data track having data transitions at an azimuthal orientation relative to the path direction, and a servo track having servo positioning transitions, the module comprising:

a substrate to provide a tape bearing surface for the tape;

a thin film data track element constructed on the substrate and configured to at least one of read from and write to the data track at the azimuthal orientation; and a thin film servo track sensing element constructed on the substrate and configured to read the positioning transitions from the servo track, wherein the thin film data track element and the thin film servo track sensing element are oriented relative to each other at an angle substantially equal to the azimuthal orientation.

19. The module of claim 18 wherein the substrate includes a recessed area and wherein one of the thin film data track element and the thin film servo track sensing element is on a side wall of the recessed area.

20. The module of claim 18 the module includes a raised feature and wherein one of the thin film data track element and the thin film servo track sensing element is on a side wall of the raised feature.

* * * * *